United States Patent [19]
Williamson et al.

[11] Patent Number: 6,000,729
[45] Date of Patent: Dec. 14, 1999

[54] HOSE COUPLING

[75] Inventors: Nigel D. L. Williamson, Sheffield, United Kingdom; Michael Joseph Harrigan, Sr., Ann Arbor, Mich.

[73] Assignees: Pilot Indutries, Inc., Dexter; Ford Global Technologies, Inc., Dearborn, both of Mich.

[21] Appl. No.: 09/112,496

[22] Filed: Jul. 9, 1998

[51] Int. Cl.$^6$ .................................................. F16L 39/02
[52] U.S. Cl. .......................... 285/242; 285/319; 285/921
[58] Field of Search .................................. 285/246, 255, 285/247, 242, 248, 921, 322, 319

[56] References Cited

U.S. PATENT DOCUMENTS

| | | | |
|---|---|---|---|
| 184,639 | 11/1876 | Loring | 285/246 |
| 862,349 | 8/1907 | Robbins | 285/246 |
| 1,509,484 | 9/1924 | Powell | 285/246 |
| 3,724,882 | 4/1973 | Dehar | 285/243 |
| 4,088,349 | 5/1978 | Guest | 285/255 |
| 4,923,226 | 5/1990 | Bartholomew | 285/242 |
| 4,929,002 | 5/1990 | Sauer | 285/921 |
| 4,969,669 | 11/1990 | Sauer | 285/921 |
| 5,005,878 | 4/1991 | Smith | 285/921 |
| 5,140,738 | 8/1992 | Pinkerman, Jr. | 29/451 |
| 5,286,072 | 2/1994 | Ruppert et al. | 285/247 |
| 5,370,424 | 12/1994 | Wendorff | 285/332.4 |

FOREIGN PATENT DOCUMENTS

| | | | |
|---|---|---|---|
| 648879 | 9/1962 | Canada | 285/247 |
| 496068 | 7/1992 | European Pat. Off. | 285/247 |
| 356646 | 10/1961 | Switzerland | 285/247 |

*Primary Examiner*—Eric K. Nicholson
*Attorney, Agent, or Firm*—Gifford, Krass, Groh, Sprinkle, Anderson & Citkowski, P.C.

[57] ABSTRACT

A connector is disclosed before attaching a flexible hose to a rigid tube in which the tube includes an outwardly and circumferentially extending bead around its free end. Both the hose and tube are circular in cross sectional shape. Furthermore, the hose is dimensioned so that, with the hose positioned around the tube and over the bead, the hose stretches outwardly and forms an annular bulge having a predetermined diameter around the bead. The connector includes an annular collar having a sleeve and radially inwardly extending flange at one of the sleeve. A circular throughbore is provided through the flange which has a preset diameter less than the predetermined diameter of the hose bulge around the bead. Similarly, an annular ring has an inside diameter less than the predetermined diameter and the ring is positioned over the hose. The ring and collar are secured together such that the ring and flange are positioned on opposite axial sides of the bead thereby securing the hose to the tube.

7 Claims, 1 Drawing Sheet

HOSE COUPLING

BACKGROUND OF THE INVENTION

I. Field of the Invention

The present invention relates generally to connectors and, more particularly to connectors for securing a flexible hose to a rigid tube.

II. Description of the Prior Art

There are a number of previously known connectors for securing a flexible hose to a rigid tube of the type having a radially outwardly and circumferentially extending bead formed adjacent the free end of the tube. Such connectors, are commonly used in many industries, including the automotive industry.

One type of previously known connector comprises an elongated metal band which extends around the flexible hose positioned over the rigid tube. A worm drive or similarly mechanism reduces the diameter of the metal band around the hose to deform the material into sealing contact with the rigid tube.

These previously known hose clamps, however, have not proven wholly satisfactory in operation. One disadvantage of such hose clamps is that, due to the worm drive or similar mechanism used to reduce the diameter of the clamp around the hose, a less than ideal circular clamping force is applied to the hose. This, in turn, often times results in an improperly sealed interface between the hose and the rigid tube which can result in leakage at the connection.

A still further disadvantage of the type of previously known hose clamps is that the hose clamp necessarily relies upon radial inward deformation of the resilient hose against the rigid tube in order to obtain the required seal. Such hose deformation, however, may cause undesirable collapse of the rigid tube, thereby adversely affecting not only the fluid seal between the hose and the tube, but also the fluid communication through the hose and tube coupling.

Similarly, the radial inward deformation of the hose can damage an inner hose liner, if present, in the hose. Such hose linings are common in automotive fuel systems to prevent the leakage of hydrocarbons. Damage to such liners result in unacceptable leakage of hydrocarbons from the hose.

SUMMARY OF THE PRESENT INVENTION

The present invention provides a coupling for a resilient hose and rigid tube which overcomes all the above-mentioned disadvantages of the previously known couplings.

In brief, the coupling of the present invention is provided for use with a flexible hose positioned over a rigid tube of the type a radially outwardly and circumferentially extending bead formed adjacent the free end of the tube. The flexible hose is dimensioned so that the flexible hose fits around the tube and, in doing so, the portion of the hose extending over the bead stretches radially outwardly thus forming a circumferentially extending bulge on the hose once positioned over the tube with its bead.

The coupling comprises an annular collar having a sleeve and a radially extending flange at one end of the sleeve. An axial throughbore is formed through the flange of a preset diameter which is less than the predetermined diameter of the hose bulge around the bead.

The coupling further includes an annular ring also having a circular inner bore of a diameter less than the predetermined diameter of the hose bulge around the bead. The annular collar is positioned around the hose on one side of the bead while, similarly, the ring is also positioned around the hose but on the opposite of the bead.

Means are provided for detachably securing the ring and collar together such that the tube bead is entrapped between and the flange. In one embodiment, a radially inwardly extending lip on the other end of the collar sleeve engages in annular abutment surface on the ring to secure the ring and collar together. In a second embodiment of the invention, a threaded engagement is provided between the sleeve and the ring. In both cases, the ring and collar are detachably secured together and thus separable when desired.

As will become hereinafter apparent, the primary advantage of Applicant's invention is that, since both the flange and ring have circular portions which face the bead, an evenly distributed pressure is applied by the flange and ring to the hose on opposite sides of the bead thereby eliminating possible leakage paths around the connector. Furthermore, the connector secures the hose to the rigid tube without undue inward radial compression of the hose thus eliminating the possibility of tube deformation and/or deformation of an inner liner, if present, on the hose.

BRIEF DESCRIPTION OF THE DRAWING

A better understanding of the present invention will be had upon reference to the following detailed description when read in conjunction with the accompanying drawing, wherein like reference characters refer to like parts throughout several views, in which.

DETAILED DESCRIPTION OF A PREFERRED EMBODIMENT OF THE PRESENT INVENTION

Figure 1:
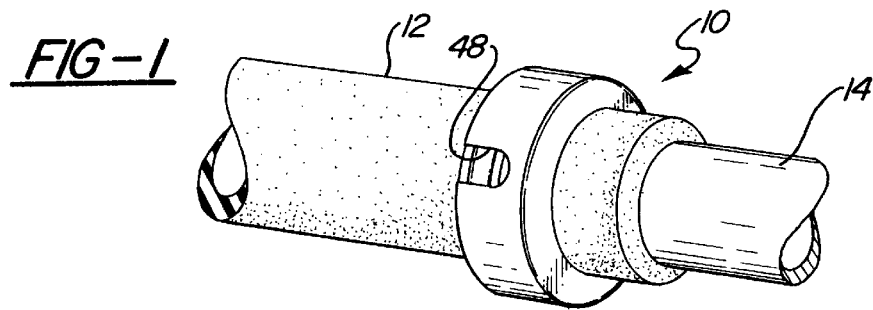
FIG. 1 is an elevational view illustrating a first preferred embodiment of the present invention.
Figure 2:
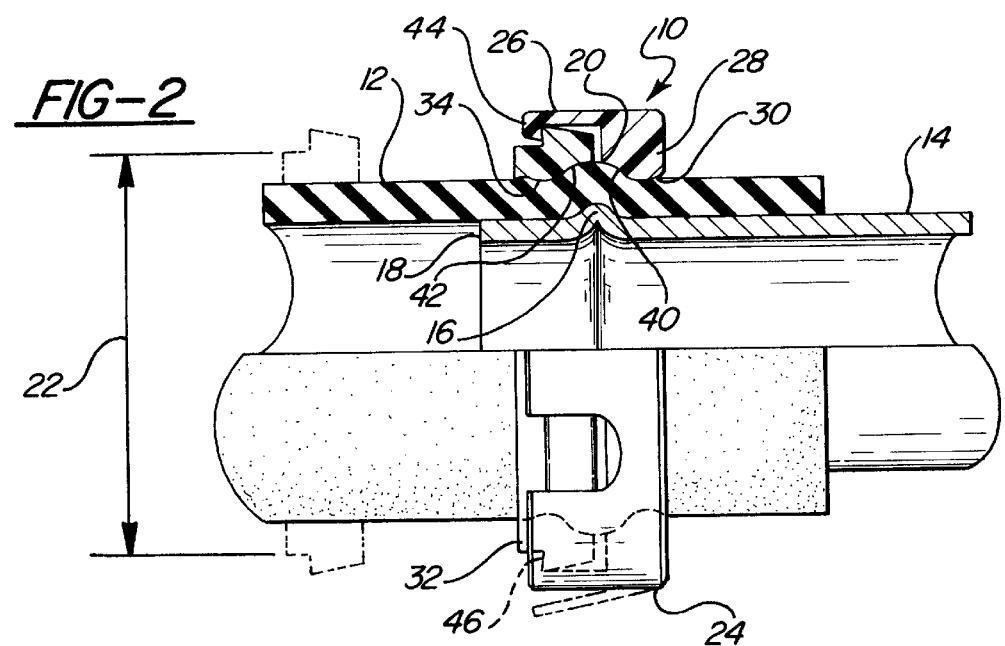
FIG. 2 is a longitudinal section view illustrating the first preferred embodiment of the present invention; and, FIG. 3 is a longitudinal section view illustrating a second preferred embodiment of the present invention.

With reference first to FIGS. 1 and 2, a first preferred embodiment of the connector of the present invention is there shown for securing a flexible hose 12 to a rigid tube 14. Both the hose 12 and tube 14 are circular in cross sectional shape. Additionally, the tube 14 includes a radially outwardly and circumferentially extending bead 16 adjacent its free end 18.

As best shown in FIG. 2, the hose 12 is dimensioned so that it extends around the tube 14 and bead 16 and snugly fits on an outside diameter of the tube 14. Furthermore, with the hose 12 positioned over the tube 14, the portion 20 of the hose 12 extending over the bead 16 stretches radially outwardly and forms an outwardly extending and circumferentially extending bulge having a predetermined diameter 22.

Still referring to FIG. 2, in the first preferred embodiment of the invention, the coupling 10 comprises an annular collar 24 having a sleeve 26 and a radially inwardly extending flange 28 at one end of the sleeve 26. This flange 28, includes a circular throughbore 30 having a diameter less than the predetermined diameter 22 of the hose portion 20.

The coupling 10 further comprises an annular ring 32 positioned around the hose 12. The ring 32 includes a circular axial bore 34 which is also less in diameter than the predetermined diameter 22 of the hose portion 20.

Both the collar 24 and ring 34 are positioned around the hose 12 so that the ring 32 and collar flange 28 are positioned on opposite axial ends of the tube bead 16. Furthermore, both the ring 32 and flange 28 preferably include arcuate surfaces 40 and 42, respectively, which face the bead 16 and thus conform to the outwardly stretched hose 20 forming the annular bulge.

Still referring to FIG. 2, the ring 32 and collar 24 are secured together to secure the hose 12 to the tube 14. In the first preferred embodiment (FIG. 2) an inwardly extending lip 44 is provided on the end of the sleeve 26 opposite from the flange 28. This lip 44 engages in annular abutment surface 46 formed on the ring 32 when the sleeve 26 is coaxially positioned around the ring 32.

Referring again to FIGS. 1 and 2, an axially extending notch 48 is provided through the collar 26 so that one end of the notch 48 is open to the end of the sleeve 26 opposite from the flange 28. This notch 48 allows the sleeve 26 to flex radially outwardly, as shown in phantom line in FIG. 2, as the ring 32 is moved from its disconnected position, illustrated in phantom line, to its connected position, illustrated in solid line.

The collar 24 is preferably of a one piece construction. Likewise, the ring 32 is also preferably of a one piece construction. Although any material may be used to manufacture the collar 24 and sleeve 26 preferably both are made of plastic.

Figure 3:
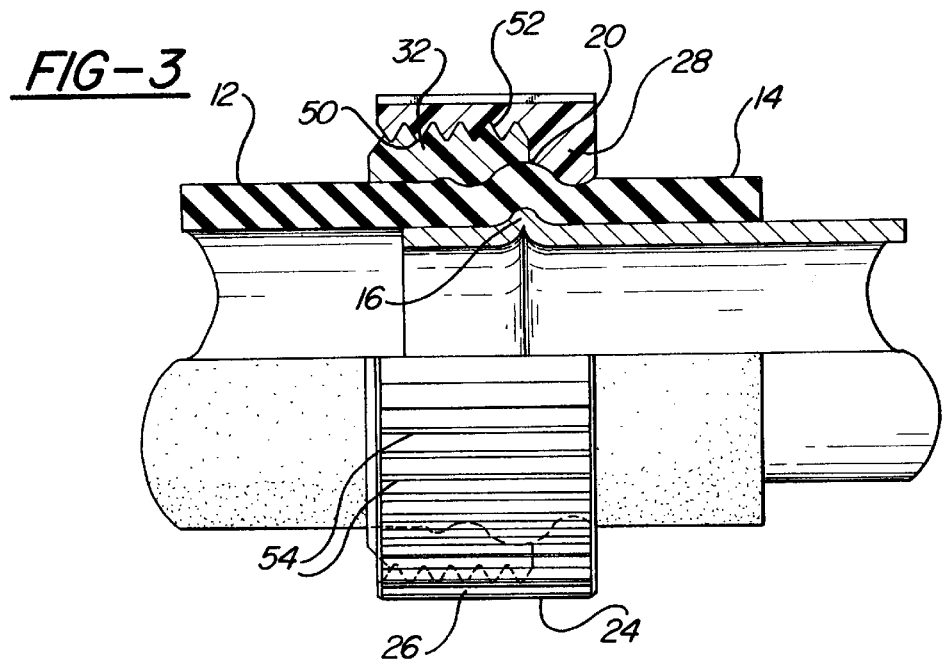

With reference now to FIG. 3, a second preferred embodiment of the present invention is there shown. The second preferred embodiment (FIG. 3) differs from the first preferred embodiment (FIG. 2) in the means for securing the ring 32 and collar 24 together.

More specifically, as shown in FIG. 3, internal threads 50 are provided on the sleeve 26 which threadably engage external threads 52 formed on the outer periphery of the ring 32. Thus, in order to secure the collar 24 and ring 32 together, the collar 24 is rotatably screwed onto the ring 32. Axially extending ridges 54 on the outer periphery of the collar 24 facilitate the rotation of the collar 24 around the ring 32.

A primary advantage of Applicant's invention is that an almost perfect circular sealing surface is applied to the resilient hose on opposite sides of the tube bead by both the ring and collar flange. These circular surfaces minimize, if not altogether eliminate, the possibility of a leakage path formed by a discontinuity of the connector. Furthermore, the connector of the present invention achieves this without unduly radially inwardly deforming the flexible hose.

Having described my invention, however, many modifications thereto will become apparent to those skilled in the art to which it pertains without deviation from the spirit of the invention as defined by the scope of the appended claims.

We claim:

1. A connector for attaching a flexible hose to a rigid tube having an outwardly and circumferentially extending bead, said hose and said tube being circular in cross sectional shape, said hose being positioned around said tube and over said bead, said hose being dimensioned so that said hose stretches outwardly to a predetermined diameter around said bead, said connector comprising:

an annular collar having a sleeve and a radially inwardly extending flange at one end of said sleeve, said collar being constructed of a flexible material, said flange having an axial circular throughbore of a preset diameter, said preset diameter being less than said predetermined diameter, an annular ring having an inside diameter less than said predetermined diameter and an outside diameter greater than an inner diameter of said flange, and means for securing said collar and said ring together so that said ring and said flange are positioned on opposite axial ends of said bead, wherein said securing means comprises a lip extending radially inwardly from a second end of said sleeve and an annular abutment surface on said ring, said abutment surface facing away from said bead and dimensioned to abut against said lip when said collar and said ring are secured together, and at least on axially extending notch in said sleeve, said notch being open to said second end of said sleeve, said notch enabling said sleeve to flex radially outwardly in response to axial compression of said ring against said sleeve in an amount sufficient to allow said ring to pass under said flange and into said sleeve whereupon said flange engages an end of said ring and retains said ring and said collar together.

2. The invention as defined in claim 1 wherein said sleeve and said flange are of a one piece construction.

3. The invention as defined in claim 1 wherein said flange includes an arcuate circumferentially surface facing said bead.

4. The invention as defined in claim 1 wherein said ring includes an arcuate circumferentially surface facing said bead.

5. The invention as defined in claim 1 wherein said ring is of a one piece construction.

6. The invention as defined in claim 1 wherein said collar is of a plastic, one piece construction.

7. The invention as defined in claim 1 wherein said ring is of a plastic, one piece construction.

* * * * *